(12) United States Patent
Barwicki et al.

(10) Patent No.: US 9,692,633 B2
(45) Date of Patent: Jun. 27, 2017

(54) ROLE-BASED RESOURCE NAVIGATION

(71) Applicants: Marek Barwicki, Schwetzingen (DE);
Alexey Arseniev, Hockenheim (DE);
Tzanko Stefanov, Karlsruhe (DE);
Markus Cherdron, Muehlhausen (DE)

(72) Inventors: Marek Barwicki, Schwetzingen (DE);
Alexey Arseniev, Hockenheim (DE);
Tzanko Stefanov, Karlsruhe (DE);
Markus Cherdron, Muehlhausen (DE)

(73) Assignee: SAP SE, Walldorf (DE)

( * ) Notice: Subject to any disclaimer, the term of this patent is extended or adjusted under 35 U.S.C. 154(b) by 582 days.

(21) Appl. No.: 14/228,658

(22) Filed: Mar. 28, 2014

(65) Prior Publication Data
US 2015/0142941 A1 May 21, 2015

Related U.S. Application Data

(60) Provisional application No. 61/904,914, filed on Nov. 15, 2013.

(51) Int. Cl.
*G06F 15/173* (2006.01)
*H04L 12/24* (2006.01)
*H04L 12/927* (2013.01)
*G06F 17/30* (2006.01)

(52) U.S. Cl.
CPC .... *H04L 41/0226* (2013.01); *G06F 17/30873* (2013.01); *H04L 47/80* (2013.01)

(58) Field of Classification Search
CPC H04L 41/0226; H04L 47/80; G06F 17/30873

USPC ........................................................ 709/223
See application file for complete search history.

(56) References Cited

U.S. PATENT DOCUMENTS

| | | | |
|---|---|---|---|
| 6,952,620 B2 | 10/2005 | Cherdron et al. |
| 7,050,056 B2 | 5/2006 | Meyringer |
| 7,225,424 B2 | 5/2007 | Cherdron et al. |
| 7,302,648 B1 | 11/2007 | Brunner |

(Continued)

FOREIGN PATENT DOCUMENTS

| | | |
|---|---|---|
| CN | 102880723 A | 1/2013 |
| EP | 02024244 | 10/2002 |

OTHER PUBLICATIONS

Office Action in related matter U.S. Appl. No. 14/226,379 mailed May 5, 2016; 17 pages.
U.S. Appl. No. 13/904,561, filed May 29, 2013, Andreas Kunz.

*Primary Examiner* — Richard G Keehn
(74) *Attorney, Agent, or Firm* — Fish & Richardson P.C.

(57) ABSTRACT

The present disclosure involves systems, software, and computer-implemented methods for providing role-based resource navigation. An example method includes identifying a particular navigation intent from a user associated with a particular user role, the navigation intent representing an action associated with the particular business object; determining a particular target mapping associated with the particular navigation intent based at least in part on the particular user role, the target mapping associated with an application to be executed in response to identification of the associated navigation intent; and executing the application associated with the particular target mapping in response to determining the particular target mapping.

19 Claims, 8 Drawing Sheets

(56) References Cited

U.S. PATENT DOCUMENTS

| | | | |
|---|---|---|---|
| 7,555,543 B2 * | 6/2009 | Encarnacion | H04L 12/2812 709/223 |
| 7,581,204 B2 | 8/2009 | Reeder et al. | |
| 7,600,014 B2 | 10/2009 | Russell | |
| 7,600,215 B2 | 10/2009 | Cherdron et al. | |
| 7,797,370 B2 | 9/2010 | Brunswig et al. | |
| 7,925,968 B2 | 4/2011 | Fischer et al. | |
| 8,018,473 B2 | 9/2011 | Sylthe et al. | |
| 8,117,529 B2 | 2/2012 | Melamed et al. | |
| 8,307,300 B1 | 11/2012 | Fisher | |
| 8,380,648 B2 | 2/2013 | Matson et al. | |
| 8,407,297 B2 | 3/2013 | Schmidt-Karaca et al. | |
| 8,463,075 B2 | 6/2013 | Bastide et al. | |
| 8,474,820 B2 | 7/2013 | Walker et al. | |
| 8,566,699 B2 | 10/2013 | Tomasic et al. | |
| 8,620,770 B1 | 12/2013 | Pope | |
| 8,645,300 B1 | 2/2014 | Cowdrey et al. | |
| 8,645,823 B1 | 2/2014 | Thiess | |
| 9,122,981 B1 * | 9/2015 | Pope | G06N 5/003 |
| 2003/0237044 A1 | 12/2003 | Hayer et al. | |
| 2004/0088210 A1 | 5/2004 | Tsyganskiy | |
| 2005/0076311 A1 | 4/2005 | Kusterer et al. | |
| 2005/0138137 A1 * | 6/2005 | Encarnacion | G06F 17/30887 709/217 |
| 2005/0165761 A1 * | 7/2005 | Chan | G06F 17/30395 |
| 2006/0010229 A1 | 1/2006 | Chen et al. | |
| 2010/0153428 A1 * | 6/2010 | Schechter | G06F 17/30867 707/768 |
| 2011/0078203 A1 | 3/2011 | Cohen et al. | |
| 2011/0148878 A1 | 6/2011 | Baikie | |
| 2011/0208730 A1 * | 8/2011 | Jiang | G06F 17/30864 707/727 |
| 2011/0209159 A1 | 8/2011 | Baratz et al. | |
| 2011/0252305 A1 | 10/2011 | Tschani et al. | |
| 2011/0264518 A1 * | 10/2011 | Liu | G06Q 30/02 705/14.49 |
| 2011/0298724 A1 | 12/2011 | Ameling et al. | |
| 2012/0158693 A1 | 6/2012 | Papadimitriou et al. | |
| 2012/0235938 A1 | 9/2012 | Laubach | |
| 2012/0245996 A1 * | 9/2012 | Mendez | G06Q 30/0241 705/14.49 |
| 2013/0007147 A1 | 1/2013 | Toga et al. | |
| 2013/0080641 A1 | 3/2013 | Lui et al. | |
| 2013/0212462 A1 | 8/2013 | Athas et al. | |
| 2013/0239028 A1 | 9/2013 | Forutanpour et al. | |
| 2014/0013203 A1 | 1/2014 | Rogoveanu | |
| 2014/0244661 A1 * | 8/2014 | Peiris | G06F 17/30401 707/748 |
| 2014/0330809 A1 * | 11/2014 | Raina | G06F 17/2705 707/722 |
| 2014/0330818 A1 * | 11/2014 | Raina | G06Q 30/02 707/723 |
| 2015/0088648 A1 * | 3/2015 | Chitnis | G06Q 30/0256 705/14.54 |

* cited by examiner

ROLE-BASED RESOURCE NAVIGATION

CROSS REFERENCE TO RELATED APPLICATIONS

This application claims the benefit of priority of U.S. Provisional Application No. 61/904,914, filed Nov. 15, 2013, which is hereby incorporated by reference.

BACKGROUND

The present disclosure involves systems, software, and computer-implemented methods for providing role-based resource navigation.

Network navigation may be performed using unique resource identifiers, such as uniform resource locators (URLs). In some cases, URLs may be used to address applications within a system. For example, the user may click on a link within a webpage displayed within a browser application to launch a specific application, or to perform a specific action. Such a click may generate a Hypertext Transfer Protocol (HTTP) request for the URL associated with a link. In response, the server receiving the request may invoke an application associated with the URL.

SUMMARY

The present disclosure involves systems, software, and computer-implemented methods for providing role-based resource navigation. In one general aspect, an example method includes identifying a particular navigation intent from a user associated with a particular user role, the navigation intent representing an action associated with the particular business object; determining a particular target mapping associated with the particular navigation intent based at least in part on the particular user role, the target mapping associated with an application to be executed in response to identification of the associated navigation intent; and executing the application associated with the particular target mapping in response to determining the particular target mapping.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

The present disclosure involves systems, software, and computer-implemented methods for providing role-based resource navigation.

The present disclosure describes a URL-based navigation scheme that enables user specific navigation and navigation exploration by decoupling the navigation intent from the actual navigation target using user roles.

In current approaches to navigation, the intent of a navigation is either expressed in a very technical manner in the URL or not exposed at all. For instance, certain solutions may trigger navigation programmatically, such as by JavaScript or other methods. In such a case, the intent of the navigation may not be exposed at all in the URL. Other approaches expose URLs addressing a target application in an encoded manner, such that the intent of the navigation can be only understood by experts. Most navigation approaches do not enable the client to explore available navigation intents. Accordingly, a user cannot get a complete or context-sensitive list of available intents to explore further navigation possibilities.

Current approaches also do not support role-based mapping between the navigation intent and the actual target of the navigation. In such approaches, a URL points statically to a single application, no matter which role the user is assigned. In such a case, it may not be possible to provide role-specific target resolution using a single URL.

The present approach provides a navigation scheme in which navigation intents are human readable, and in which the target applications associated with the navigation intent may be specific to the user's role. One example method involves identifying a particular navigation intent representing an action associated with a particular business object associated with a particular user role. A particular target mapping is then determined for the navigation intent based at least in part on the particular user role. The application associated with that particular target mapping is then executed in response to determining the particular target mapping.

The present solution may provide several potential advantages. By providing a human readable navigation scheme, a user may be able to easily browse their navigation history and identify previously executed intents, allowing the user to easily access previously accessed applications and business objects. The user may also be able to bookmark frequently used navigation intents. Since the navigation intent is human readable, a user may be able to directly manipulate it, such as, for example, by changing the action, the object, parameters, etc. Further, allowing the target applications for the navigation intents to vary based on the user's role provides additional flexibility and control for the application designer. The navigation scheme further serves to decouple applications from one another, as an application designer will not have to include direct links to the application, which may change or become stale.

Figure 1:
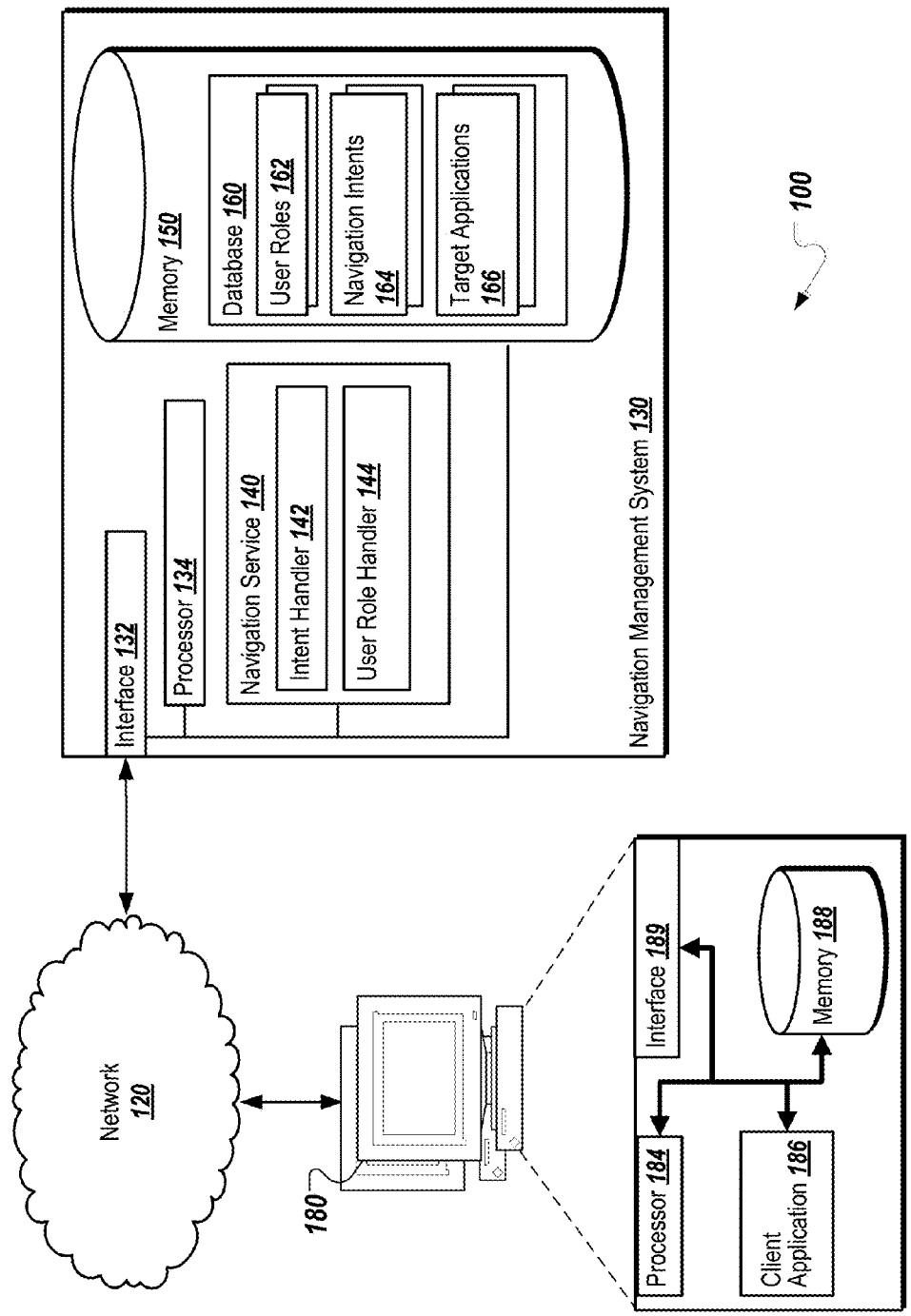
FIG. 1 is a block diagram illustrating an example environment for providing role-based resource navigation.

FIG. 1 is a block diagram illustrating an example environment 100 for providing role-based resource navigation.

As shown, the example environment 100 includes a navigation management system 130, one or more clients 180 connected to the navigation management system 130 by a network 120. In operation, the navigation management system 130 may be operable to receive requests from the one or more clients 180 including navigation intents. The navigation management system 130 may be operable to associate a user role with the user that has requested the navigation intent, and provide one or more target applications for the requested navigation intent based on the user's assigned user roles. In some implementations, the navigation intent may be included within a URL, such as the example URL 300 shown in FIG. 3.

In the illustrated implementation, the example environment 100 includes a navigation management system 130. At a high level, the navigation management system 130 comprises an electronic computing device operable to receive navigation requests including resource IDs from the client 180 and provide target applications to the client based on a user role associated with a user of the client. The navigation management system 130 may be a distributed system including different servers and components. In some implementations, the navigation management system 130 may be a combination of hardware components and software components. The navigation management system 130 may also be a single computing device.

In some implementations, the navigation management system 130 may be a web service that is accessible via standard web protocols, such as, for example, Hypertext Transfer Protocol (HTTP), Simple Object Access Protocol (SOAP), or any other suitable protocol or combination of protocols. In some cases, the navigation management system 130 may provide an Application Programming Interface (API) through which the client 180 may submit navigation requests.

As used in the present disclosure, the term "computer" is intended to encompass any suitable processing device. For example, although FIG. 1 illustrates a navigation management system 130, environment 100 can be implemented using two or more servers, as well as computers other than servers, including a server pool. Indeed, navigation management system 130 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated navigation management system 130 may be adapted to execute any operating system, including Linux, UNIX, Windows, Mac OS®, Java™, Android™, iOS or any other suitable operating system. According to one implementation, navigation management system 130 may also include or be communicably coupled with an e-mail server, a Web server, a caching server, a streaming data server, and/or other suitable server.

The navigation management system 130 also includes an interface 132, a processor 134, and a memory 150. The interface 132 is used by the navigation management system 130 for communicating with other systems in a distributed environment—including within the environment 100—connected to the network 120; for example, the clients 180, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or interface's hardware is operable to communicate physical signals within and outside of the illustrated environment 100.

As illustrated in FIG. 1, the navigation management system 130 includes a processor 134. Although illustrated as a single processor 134 in FIG. 1, two or more processors may be used according to particular needs, desires, or particular implementations of environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the navigation management system 130. Specifically, the processor 134 may execute the functionality required to receive and respond to requests from the clients 180.

In the illustrated implementation, the navigation management system 130 includes a navigation service 140. In some implementations, the navigation service 140 may be operable to perform the navigation intent to target mapping association based on user role. In some implementations, the navigation service 140 may be a software process or set of software processes executing on the navigation management system 130. The navigation service 140 may also be a network service executing on a separate computing device from the navigation management system 130. The navigation service 140 may utilize the interface 132 to send and receive data from the network 120, such as receiving requests from the one or more clients 180, and sending responses to these requests. The navigation service 140 may also utilize the memory 150 to read and write data needed for operation, such as user roles, navigation intents, and target applications.

The navigation service 140 may include an intent handler 142. In operation, the intent handler 142 may be operable to receive a requested URL including a navigation intent, and parse the URL to extract the navigation intent. The intent handler 142 may check this parsed intent against the database 160 to determine if the intent is valid, such as by determining if the navigation intent is included in the navigation intents 164. In some cases, the intent handler 142 may retrieve target applications mapped to the specific navigation intent from the set of target applications 166. In some cases, the intent handler 142 may be a module or set of modules in the navigation service 140. The intent handler 142 may also be an external network service accessible by the navigation service 140 to perform the described functions.

In the illustrated implementation, the navigation service 140 also includes a user role handler 144. In operation, the user role in the 144 may be operable to determine which of the target applications 166 are associated with the received navigation intent given the requesting user's role or roles. In some implementations, the user role handler 144 may determine the user's role or roles based on a previous exchange prior to the user requesting the navigation intent, such as a login exchange. In some cases, the user's login credentials may be included in the request. In some cases, the user role in their 144 may respond to the client with a list of target applications associated with the received navigation intent. For example, if the user is associated with multiple roles, each role may be associated with a different target application for the particular navigation intent. If the user is associated with a single user role, the particular navigation intent may still be associated with multiple target applications, in which case the user role in their 144 may return a list of the target applications.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The navigation service system 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the navigation service system 130. Additionally, the memory 150 may include any other appropriate data, such as VPN applications, firmware logs and policies, firewall policies, a security or access log, print or other reporting files, as well as others.

As illustrated in FIG. 1, memory 150 includes or references data and information associated with and/or related to providing the network service load control. As illustrated, memory 150 includes a database 160. The database 160 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 160 may be operable to process queries specified in any structured or other query language such as, for example, Structured Query Language (SQL).

As shown, the database 160 includes one or more user roles 162. In some implementations, the user roles 162 may be general classes of users to which individual users may be assigned. The user roles 162 may be stored within the database 160, or may be retrieved from an external system, such as a user authentication system or role management system.

Figure 3:
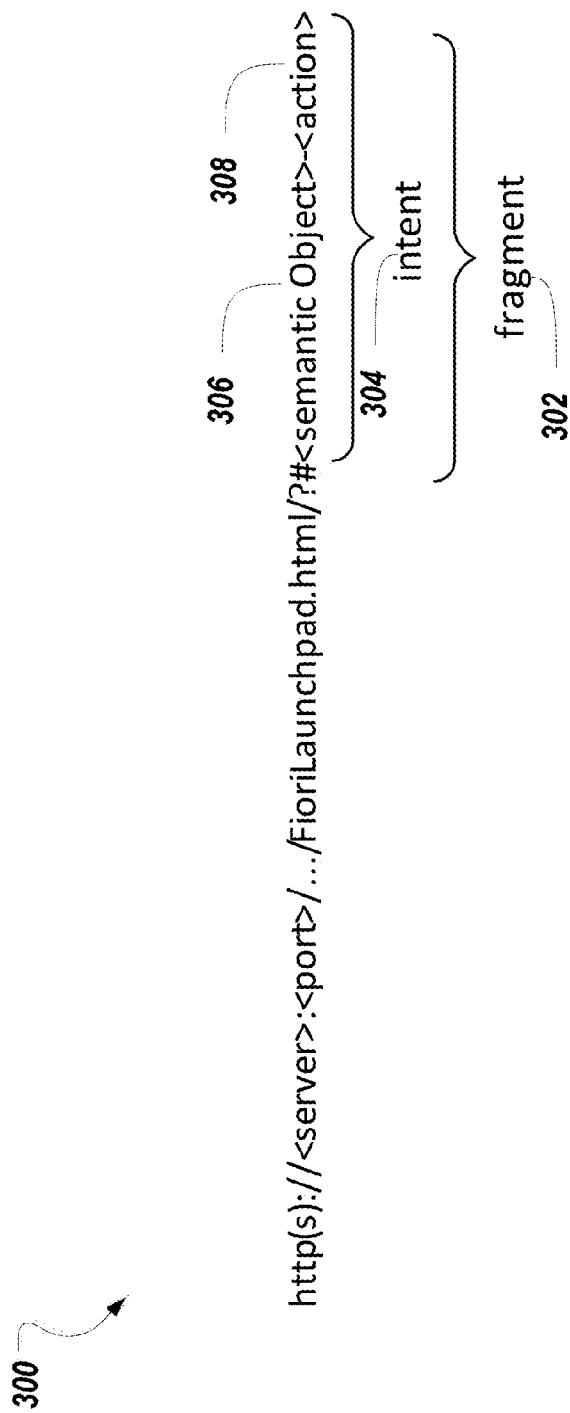
FIG. 3 is an example uniform resource locator (URL) including a navigation intent.

The database 160 may also include navigation intents 164. In some implementations, the navigation intents 164 may be formatted as shown in FIG. 3, the may include an object and an action. In some cases, the navigation intents 164 may include an encoded contextual identifier including additional information about the requested intent.

In the illustrated implementation, the database 160 also includes target applications 166. Target applications 166 may be applications operable to perform an operation associated with a particular navigation intent. In some implementations, the target applications may be stored as URLs by which the applications may be accessed.

The database 160 may include associations between the user roles 162, the navigation intents 164, and the target applications 166, such that for a given navigation intent, a list of one or more target applications 166 may be determined by the navigation service 140.

Illustrated client 180 is intended to encompass any computing device, such as a desktop computer, laptop/notebook computer, wireless data port, smart phone, personal data assistant (PDA), tablet computing device, one or more processors within these devices, or any other suitable processing device. For example, client 180 may comprise a computer that includes an input device, such as a keypad, touch screen, or other device that can accept user information and an output device that conveys information associated with the operation of the navigation management system 130 or client 180 itself, including digital data, visual information, or a graphical user interface (GUI). Client 180 may include an interface 189, a processor 184, a memory 188 and a client application 186. In some implementations, the client application 186 may be a web browser. Client 180 may be used by a user to access the navigation management system 130 to view or change items in the database 160, such as user roles 162.

Figure 2:
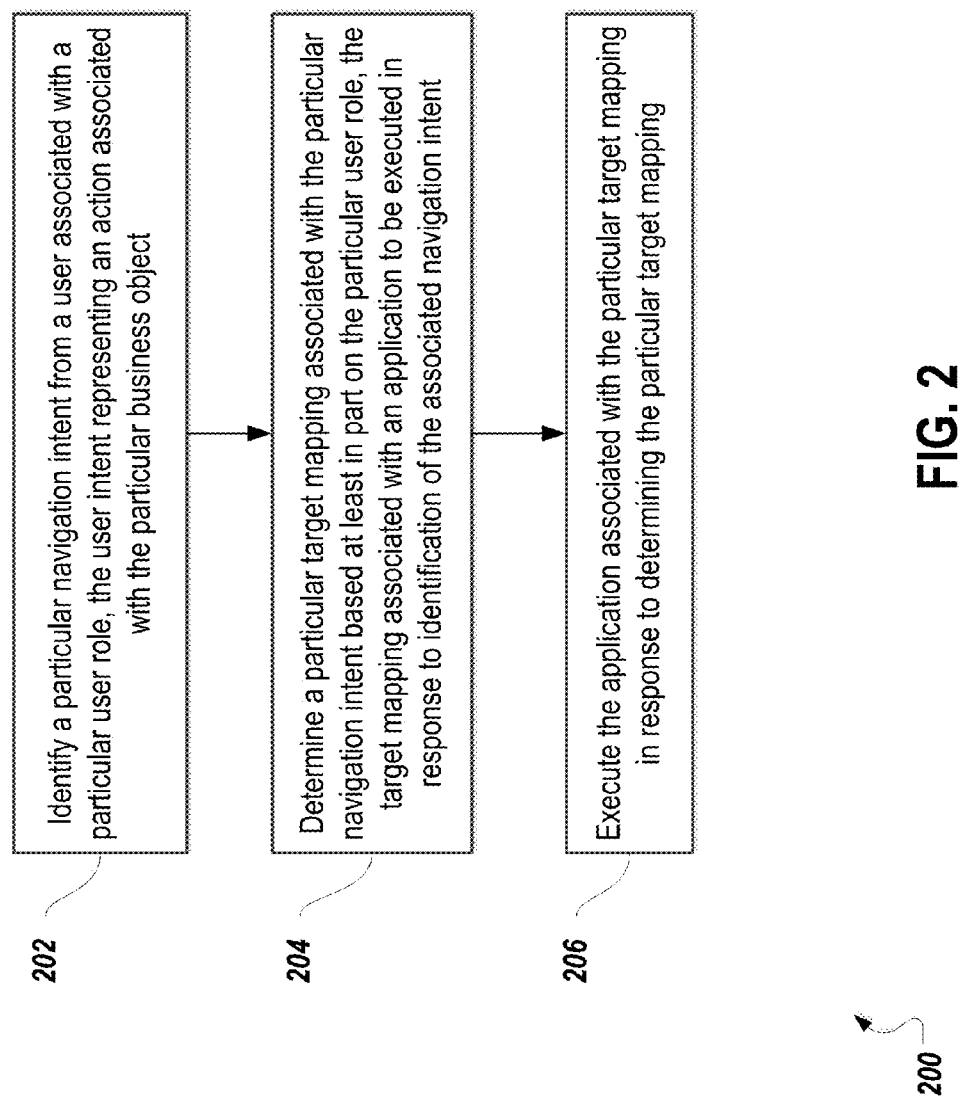
FIG. 2 is a flowchart of an example method for providing role-based resource navigation.

FIG. 2 is a flowchart of an example method for providing role-based resource navigation. For clarity of presentation, the description that follows generally describes method 200 in the context of FIG. 1. However, method 200 may be performed, for example, by any other suitable system, environment, software, and hardware, or a combination of systems, environments, software, and hardware, as appropriate. For example, one or more of the navigation management system, the client, or other computing device (not illustrated) can be used to execute method 200 and obtain any data from the memory of the client, navigation management system, or the other computing device (not illustrated).

At 202, a particular navigation intent from a user associated with a particular user role is identified, the navigation intent representing an action associated with the particular business object. At 204, a particular target mapping associated with the particular navigation intent is determined based at least in part on the particular user role, the target mapping associated with an application to be executed in response to identification of the associated navigation intent. At 206, the application associated with the particular target mapping is executed in response to determining the particular target mapping.

FIG. 3 is an example uniform resource locator (URL) 300 including a navigation intent 304. In some implementations, the URL 300 exposes the intent of the navigation in a human readable manner by combining a semantic object 306 and an action 308 in a fragment 302 at the end of the URL 300. The semantic object 306 and the action 308 may be separated by a separator, such as the "-" shown in FIG. 3. In some cases, the navigation intent 304 is placed as part of the URL fragment 302 separated by a hash (#).

The semantic object 306 may be a centrally defined business related identifier such as, for example, a SalesOrder or PurchaseOrder. The action 308 may be a verb representing the action to be executed on the semantic object (e.g. display, approve, etc.). In some implementations, an intent-based URL such as URL 300 can be bookmarked, copy/pasted or shared by email. In some cases, the navigation intent 304 does not explicitly disclose the application which will be launched. The target application is determined during target resolution based on target mapping assigned to the user role(s).

The navigation intent 304 does not explicitly expose the target application, which will launch when navigating. The actual application for a given intent is defined in a target mapping. There can be any number of target mappings for a given navigation intent. Which target mapping is used at runtime depends at least in part on the targets mappings assigned to the requesting user's role(s). The role dependency enables different users to call different applications for the same navigation intent. For example, a user with an "employee" user role may be routed to a limited employee view application for the navigation intent "employee-view," while a user with a "manager" role may be routed to an employee view application with additional functionality for the same navigation intent. A user may, in some cases, have several target mappings assigned for the same intent. In that case a user interface may present a list of available targets and let the user choose one.

In some implementations, a user may be able to explore available intents. The list of available intents depends from role set assigned to user. In some cases, a user may query a list of available semantic (business) objects on which he can operate. The user may perform further analysis on the available intents for instance, such as, for example, which actions can be executed for a given semantic object (e.g. LeaveRequest: display, create, approve) or identify objects which can be used for specific actions on (e.g. approve: LeaveRequest, PurchaseOrder).

Figure 4:
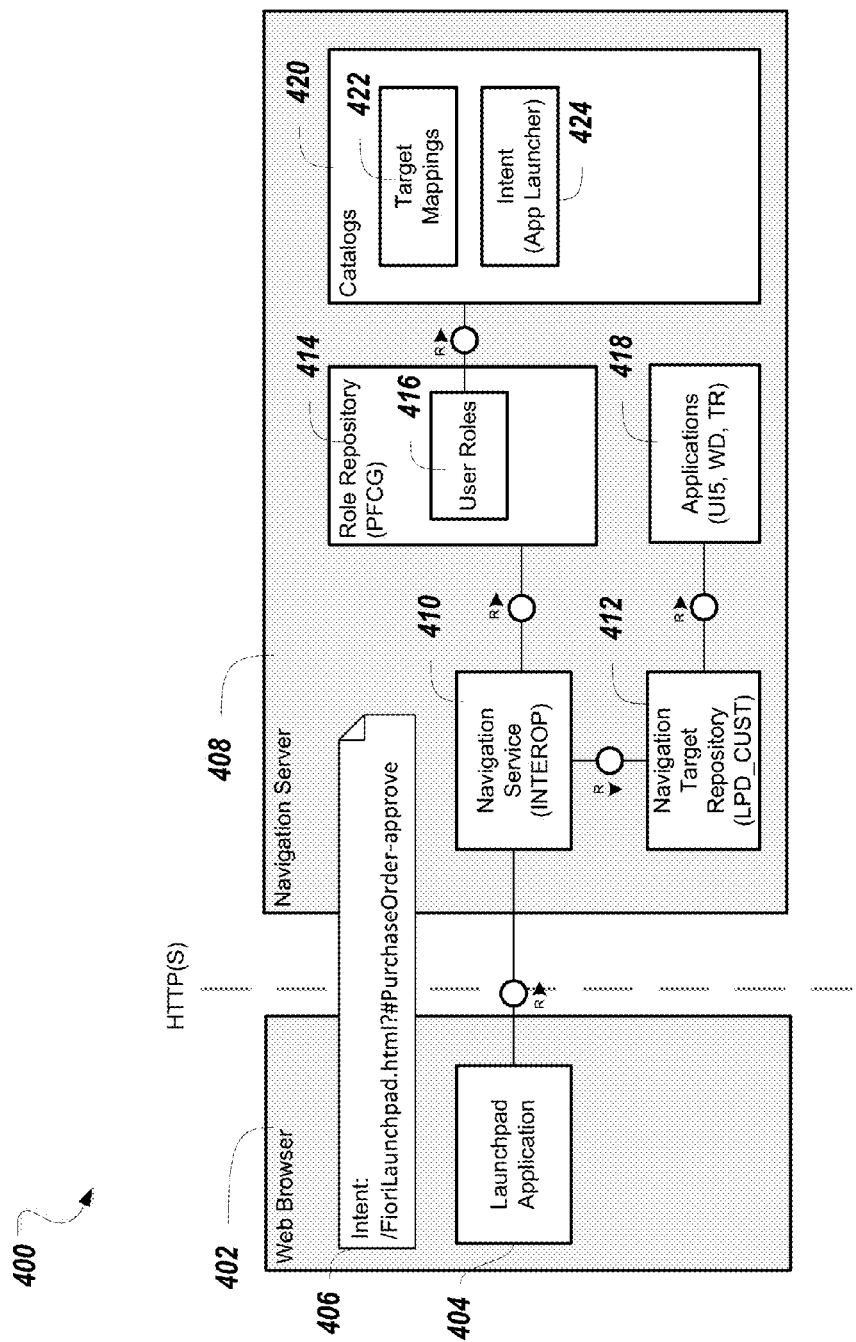
FIG. 4 is an activity diagram showing a web browser interacting with a server to determine a target for a navigation intent.

FIG. 4 is an activity diagram showing a web browser interacting with a server to determine a target for a navigation intent. The launchpad application 404 runs within the web browser 402, and interacts with the navigation server 408 to resolve navigation intents (e.g., 406) to target mappings. In some implementations, navigation intents are visualized on the launchpad application 404 as tiles. Navigation may be triggered by a user clicking on a tile associated with a given navigation intent.

A navigation service 410 executes on the navigation server 408, and is operable to determine the available navigation intents from user roles 416 assigned to the user within the role repository 414. Target mappings 424 and navigation intents 424 are grouped in catalogs 420 to simplify their role assignment.

When the user clicks on a tile, navigation resolution is triggered. The navigation service 410 searches for matching target mapping(s) 422 for the given navigation intent 406. Each target mapping stores technical information to launch the appropriate application for the intent from applications 418. In some cases, this information includes the navigation target repository name (e.g., 412) and the ID of the application within this repository. The navigation services 410 use this information to read the application details from the given repository 412, to resolve and trigger the navigation.

Figure 5:
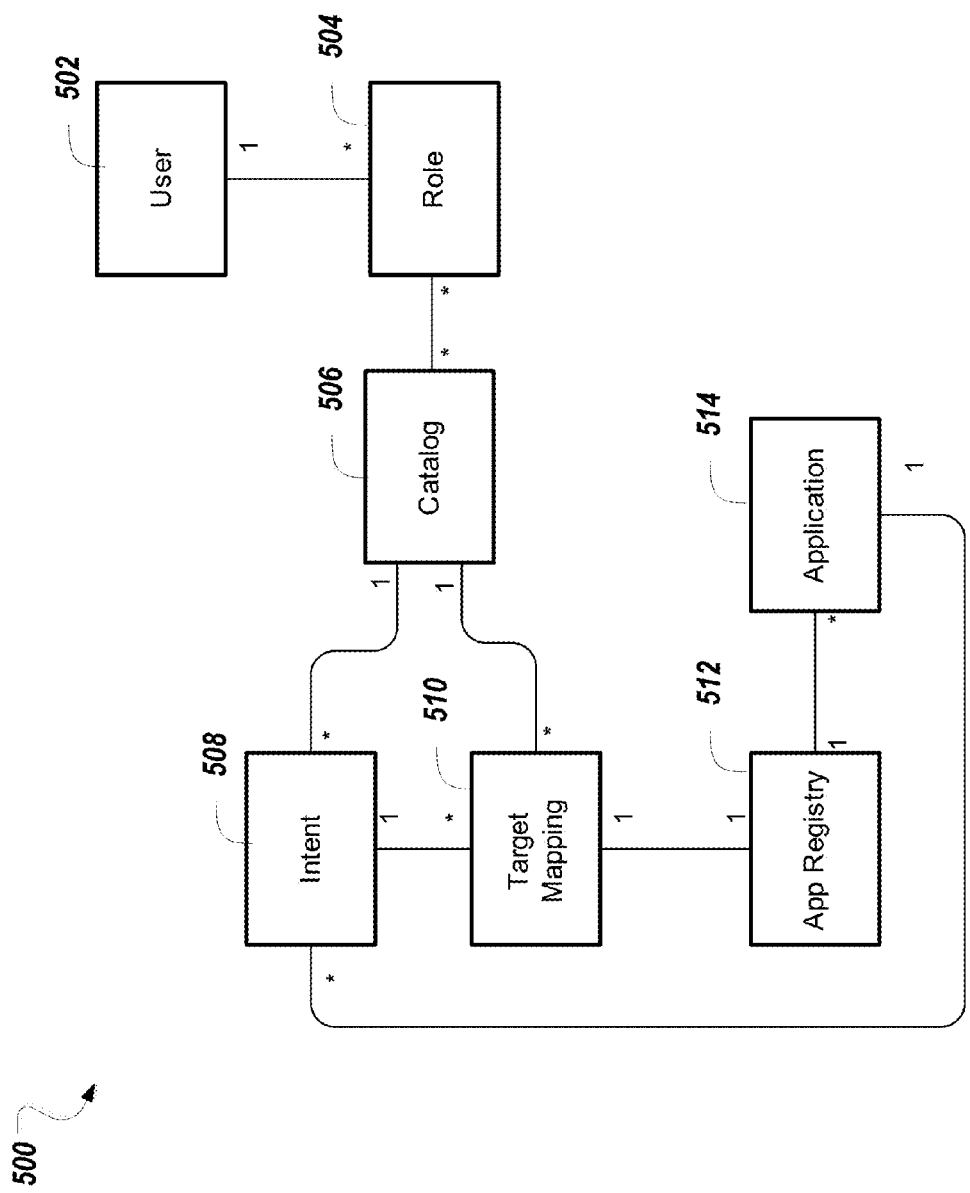
FIG. 5 is a diagram showing the dependencies between different components involved in providing role-based resource navigation.

FIG. 5 is a diagram showing the dependencies between different components involved in providing role-based resource navigation. As shown, a user 502 may be associated with many roles 504. Each role 504 may be associated with multiple catalog 506. Each catalog 506 may be associated with multiple intents 508, and target mappings 510. Each intent 508 may also be associated with multiple target mappings 510. Each target mapping 510 may be associated with an app registry 512, and each app registry 512 may be associated with multiple applications 514. In addition, each application 514 may be associated with multiple intents 508.

Figure 6:
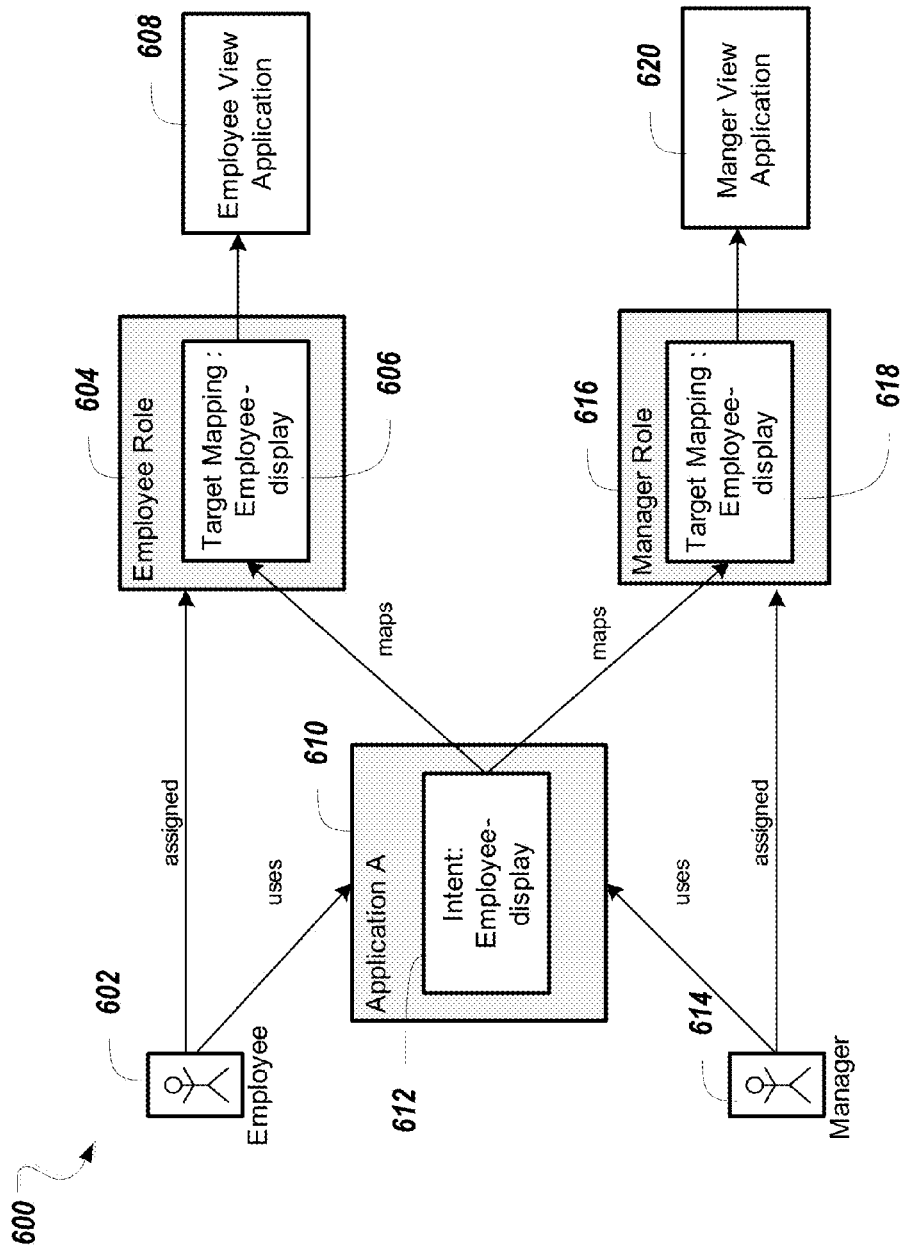
FIG. 6 is an activity diagram showing how a navigation intent may be processed differently for different user roles.

FIG. 6 is an activity diagram showing how a navigation intent may be processed differently for different user roles. As shown, employee 602 and manager 614 are both users of the application 610. The application 610 exposes the navigation intent 612. The employee 602 is assigned the user role 604 ("employee"), and the manager 614 is assigned the user role 616 ("manager"). The navigation intent 612 maps to two different target mappings 606 and 618. The target mapping 606 is assigned to the user role 604, and the target mapping 618 assigned to the user role 616 The target mapping 606 is associated with the employee view application 608, and the target mapping 618 is associated with the manager view application 620. When the employee 602 requests the navigation intent 612, such as by clicking on a link in a user interface, the employee 602 will be presented with the employee view application 608 based on the employee 602 being assigned user role 604. When the manager 614 request the navigation intent 612, the manager 614 we presented with the manager view application 620 based on the manager 614 being assigned the user role 616.

Figure 7:
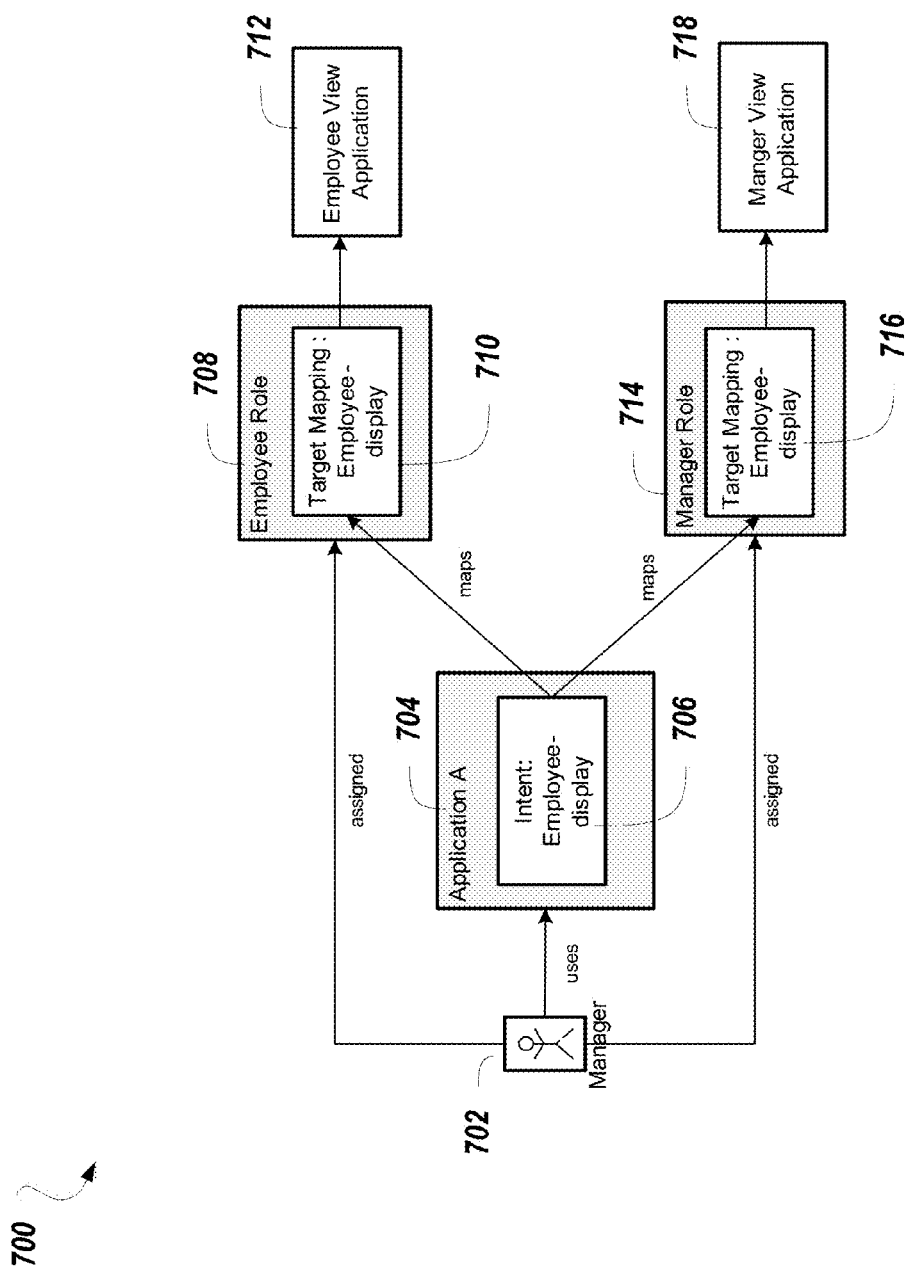
FIG. 7 is an activity diagram showing how a navigation intent may be mapped to two different target mappings based on a user having two different user roles.

FIG. 7 is an activity diagram showing how a navigation intent may be mapped to two different target mappings based on a user having two different user roles. As shown, manager 702 uses an application 704 for exposing the navigation intent 706. The manager 702 is assigned to different user roles 708 and 714 ("employee" and "manager", respectively). The user role 708 is associated with a target mapping 710 for the navigation intent 706. The target mapping 710 is associated with an employee view application 712. The role 714 is associated with a target mapping 716 for the navigation intent 706. The target mapping 716 is associated with a manager view application 718. When the manager 702 requests the navigation intent 706, the manager 702 may be presented with a list including target mappings 710 and 716. The manager 702 may choose a target mapping from this list for the navigation intent 706. In some implementations, this choice of target mapping may be stored, such that the next time the manager 702 requests the navigation intent 706, the application associated with the selected target mapping may be executed without providing the list of target mappings to the manager 702.

Figure 8:
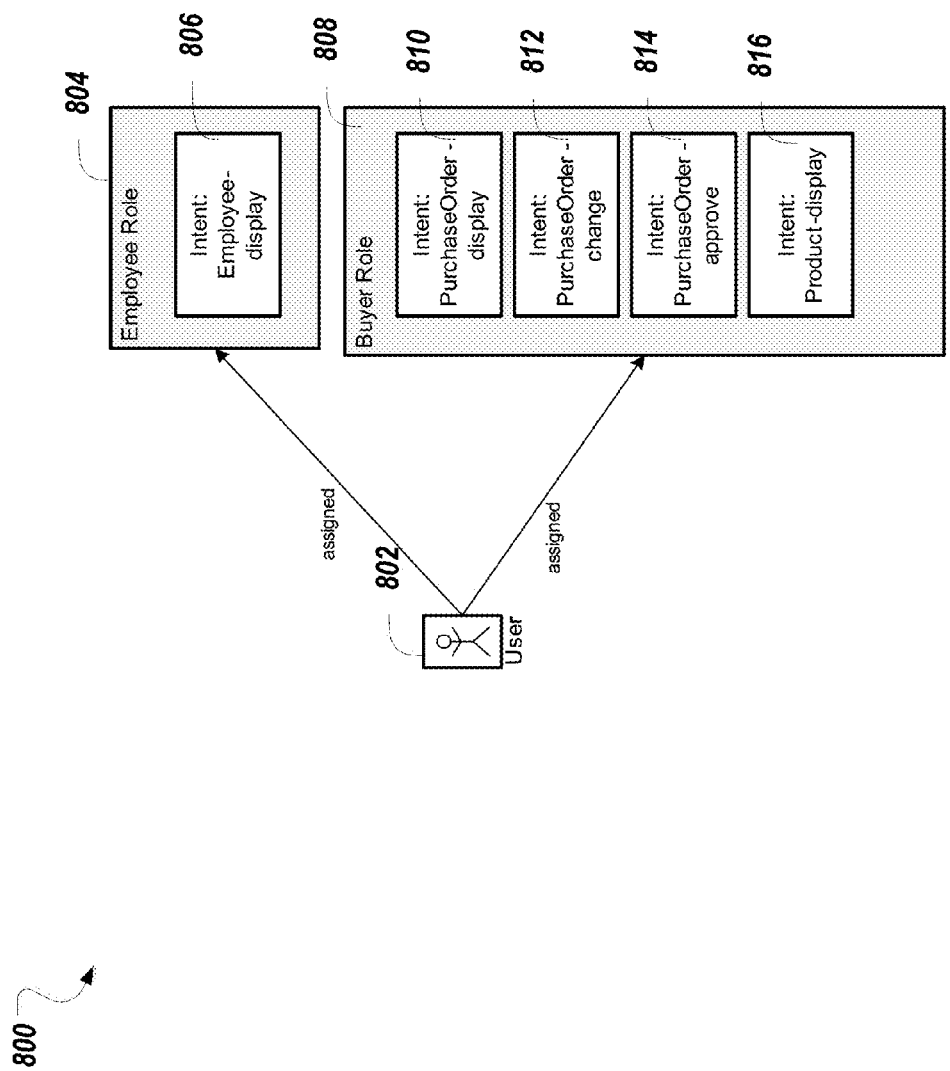
FIG. 8 is an activity diagram showing different navigation intents available to a user based on the users assigned user roles.

FIG. 8 is an activity diagram showing different navigation intents available to a user based on the users assigned user roles. As shown, the user 802 is assigned an employee role 804 and the buyer role 808. Each role is associated with multiple intents. The employee role 804 is associated with the navigation intent 806, and the buyer role 808 is associated with navigation intents 810, 812, 814, 816. These navigation intents may be presented to the user 802 based on the user's association with the user roles 804 and 808. The user 802 may explore the navigation intents 810, 812, 814, 816, such as, for example, by presenting a particular business object (e.g., a PurchaseOrder) and receiving a list of actions available for the object (e.g., display, change, approve). Such functionality allows a user to examine the actions available to them (e.g., based on their assigned user roles) for a particular business object.

The preceding figures and accompanying description illustrate example processes and computer implementable techniques. Environment 100 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
    identifying a particular navigation intent for a user associated with a particular user role from a selected uniform resource location (URL), the URL including a semantic object and an action, wherein the semantic object identifies at least one particular object and wherein the action comprises a representation of an action to be performed in association with the at least one particular object, wherein the action included in the URL identifies a navigation intent associated with the at least one particular object;
    determining a particular target mapping associated with the particular navigation intent based at least in part on the particular user role, the target mapping associated with an application to be executed in response to identification of the associated navigation intent, wherein a first user role is associated with a first application and a second user role is associated with a second application; and
    executing the application associated with the particular target mapping of the particular user role in response to determining the particular target mapping and the selected URL.

2. The method of claim 1, wherein identifying the particular navigation intent for the user comprises providing a set of relevant navigation intents associated with the particular object in response to a request for relevant navigation intents.

3. The method of claim 1, further comprising providing a set of relevant objects to which a particular action is associated in response to a request for relevant objects.

4. The method of claim 1, wherein determining the particular target mapping comprises:
    determining that two or more target mappings are associated with the particular navigation intent for the particular user role;
    providing the two or more target mappings to the user; and
    receiving the particular target mapping from the user, the particular target mapping selected from the two or more target mappings.

5. The method of claim 4, further comprising:
    storing the particular target mapping received from the user; and
    executing the application associated with the stored target mapping in response to identifying an additional navigation intent from the user.

6. The method of claim 1, wherein the semantic object includes a noun corresponding to the at least one particular object and the action includes a verb corresponding to the action associated with the at least one particular object.

7. The method of claim 1, wherein identifying the particular navigation intent for the user includes receiving a HyperText Transfer Protocol (HTTP) request for the URL.

8. The method of claim 1, wherein the particular user role includes multiple user roles and determining the particular target mapping is performed based at least in part on the multiple user roles.

9. The method of claim 1, wherein the at least one particular object comprises at least one particular business object.

10. A non-transitory, computer-readable medium storing instructions operable when executed to cause at least one processor to perform operations comprising:
    identifying a particular navigation intent for a user associated with a particular user role from a selected uniform resource location (URL), the URL including a semantic object and an action, wherein the semantic object identifies at least one particular object and wherein the action comprises a representation of an action to be performed in association with the at least one particular object, wherein the action included in the URL identifies a navigation intent associated with the at least one particular object;
    determining a particular target mapping associated with the particular navigation intent based at least in part on the particular user role, the target mapping associated with an application to be executed in response to identification of the associated navigation intent, wherein a first user role is associated with a first application and a second user role is associated with a second application; and
    executing the application associated with the particular target mapping of the particular user role in response to determining the particular target mapping and the selected URL.

11. The computer-readable medium of claim 10, wherein identifying the particular navigation intent for the user comprises providing a set of relevant navigation intents associated with the particular object in response to a request for relevant navigation intents.

12. The computer-readable medium of claim 10, further comprising providing a set of relevant objects to which a particular action is associated in response to a request for relevant objects.

13. The computer-readable medium of claim 10, wherein determining the particular target mapping comprises:
    determining that two or more target mappings are associated with the particular navigation intent for the particular user role;
    providing the two or more target mappings to the user; and
    receiving the particular target mapping from the user, the particular target mapping selected from the two or more target mappings.

14. The computer-readable medium of claim 13, the operations further comprising:
    storing the particular target mapping received from the user; and
    executing the application associated with the stored target mapping in response to identifying an additional navigation intent from the user.

15. The computer-readable medium of claim 10, wherein the semantic object includes a noun corresponding to the at least one particular object and the action includes a verb corresponding to the action associated with the at least one particular object.

16. The computer-readable medium of claim 10, wherein identifying the particular navigation intent for the user includes receiving a HyperText Transfer Protocol (HTTP) request for the URL.

17. The computer-readable medium of claim 10, wherein the particular user role includes multiple user roles and determining the particular target mapping is performed based at least in part on the multiple user roles.

18. A system comprising:
   memory for storing data; and
   one or more processors operable to perform operations comprising:
      identifying a particular navigation intent for a user associated with a particular user role from a selected uniform resource location (URL), the URL including a semantic object and an action, wherein the semantic object identifies at least one particular object and wherein the action comprises a representation of an action to be performed in association with the at least one particular object, wherein the action included in the URL identifies a navigation intent associated with the at least one particular object;
      determining a particular target mapping associated with the particular navigation intent based at least in part on the particular user role, the target mapping associated with an application to be executed in response to identification of the associated navigation intent, wherein a first user role is associated with a first application and a second user role is associated with a second application; and
      executing the application associated with the particular target mapping of the particular user role in response to determining the particular target mapping and the selected URL.

19. The system of claim 18, wherein identifying the particular navigation intent from the user comprises providing a set of relevant navigation intents associated with the particular business object in response to a request for relevant navigation intents.

* * * * *